United States Patent [19]

Matsumura et al.

[11] Patent Number: 4,859,487
[45] Date of Patent: Aug. 22, 1989

[54] METHOD FOR PRODUCING FRUIT CHIPS

[75] Inventors: Yasushi Matsumura; Takeshi Mizuguchi, both of Nara; Fumio Matsui, Moriguchi, all of Japan

[73] Assignee: House Food Industrial Company Limited, Higashi, Japan

[21] Appl. No.: 172,083

[22] Filed: Mar. 23, 1988

[30] Foreign Application Priority Data

Mar. 24, 1987 [JP] Japan .................. 62-69767

[51] Int. Cl.$^4$ .............................. A23B 7/02
[52] U.S. Cl. .................... 426/639; 426/445; 426/465
[58] Field of Search ............ 426/440, 465, 473, 242, 426/244, 640, 615, 639, 385, 419; 34/5, 16

[56] References Cited

U.S. PATENT DOCUMENTS

| | | | |
|---|---|---|---|
| 1,929,437 | 10/1933 | McComb | 426/473 |
| 2,415,995 | 2/1947 | Derby | 426/615 |
| 3,057,739 | 10/1962 | Forkner | 426/465 |
| 3,365,309 | 1/1968 | Pader et al. | 426/465 |
| 4,341,803 | 9/1982 | Koshid et al. | 426/640 |
| 4,520,574 | 6/1985 | Sugisawa et al. | 34/5 |

FOREIGN PATENT DOCUMENTS 48509 9/1985 Japan ...................... 426/615

*Primary Examiner*—Peter Kratz
*Attorney, Agent, or Firm*—Oblon, Spivak, McClelland, Maier & Neustadt

[57] ABSTRACT

A method for producing fruit chips comprises the steps of: (a) heating a peach or a melon in syrup having a Brix degree ranging from 12 to 30; (b) cutting the heated peach or melon into small pieces; (c) subjecting the pieces to a temperature conditioning treatment; (d) expanding the pieces subjected to the temperature conditioning treatment; and (e) heating the expanded pieces under a reduced pressure. This method makes it possible to provide chips of peach or melon which retain their inherent fresh taste and have excellent appearance without quality impairment to drying. Moreover, the chips are properly expanded and are crisp.

5 Claims, 1 Drawing Sheet

METHOD FOR PRODUCING FRUIT CHIPS

BACKGROUND OF THE INVENTION

1. Field of the Invention

The present invention relates to a method for producing chips of peach or melon which are properly expanded without impairing the inherent taste of these fruits and which are good in texture and crisp.

2. Description of Prior Art

Heretofore, there have been developed a variety of snack foods. For this reason, there have been conducted various studies and research into drying techniques, which are an important aspect of producing snack foods. As typical examples, there may be mentioned such drying techniques as hot-air drying, microwave drying, freeze-drying, deep-frying, and drying under a reduced pressure. Moreover, there is known a method for expanding and drying foods in which a material to be dried is exposed to the flow of superheated steam for a short period of time and the superheated and dehydrated material is then discharged into the air within brief period to cause expansion thereof. However, the snack foods produced according to this conventional drying method produce a smell of superheated material due to the heat during drying or cause the loss and degeneration of the taste thereof.

The applicant of this invention has already developed a method for drying foods effective in practicing a method for producing snack foods which makes it possible to eliminate the foregoing drawbacks (see Japanese Patent Unexamined Publication (hereunder referred to simply as "J.P. KOKAI") No. 59-159739). This method comprises quickly reducing the pressure applied to foods such as shaped dough mainly composed of vegetables, fruits or the like, or solids obtained by processing or cooking such shaped material, at a rate sufficient to expand these foods and to freeze the moisture in the foods, heating the foods to dry the same after the moisture therein is frozen and then returning the pressure to normal pressure.

OBJECT OF THE INVENTION

However, if peach or melon is treated by the aforementioned method for drying foods to obtain a snack food, it is sometimes observed that, depending on the degree of maturity of the peach or melon, kind thereof and the place at which the peach or melon was grown, the surface layer of the peach or melon snack is too soft. In other words, properties of the resultant snack food greatly depends on the quality of the peaches or melons used and thus it is difficult to always produce a snack food having satisfactory qualities.

The present invention intends to solve the problems associated with the conventional methods and to provide a new method for producing chips of peach or melon capable of providing such chips which are good in texture, are crisp and crunchy and have an appearance appropiate for such a snack food, without being affected by the quality of the starting materials.

SUMMARY OF THE INVENTION

Figure 1:
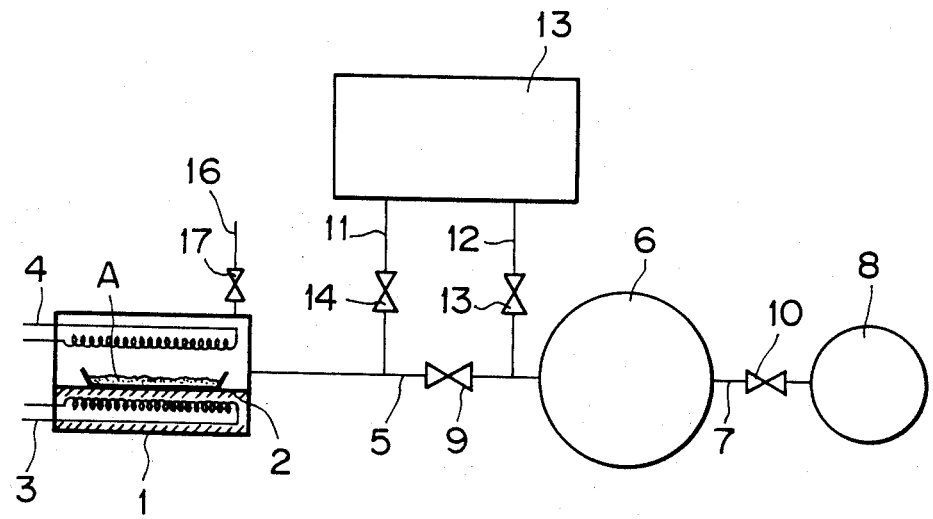
FIG. 1 is a schematic diagram illustrating an example of a specific apparatus which may be used in practicing the method of this invention.

According to the present invention, there is provided a method for producing chips of fruits which comprises the steps of:
(a) heating peach or melon in syrup having a Brix degree ranging from 12 to 30;
(b) cutting the heated peach or melon into small pieces;
(c) subjecting the pieces of peach or melon to a temperature conditioning treatment;
(d) expanding the pieces of peach or melon subjected to the temperature conditioning treatment; and
(e) heating the expanded pieces of peach or melon under a reduced pressure.

The present invention will hereunder be explained in more detail.

Fruits which are the subject of the present invention are peaches, such as white and yellow peaches, and melons such as muskmelons and princemelons. These peaches or melons are first peeled optionally followed by cutting into pieces of a proper size and then are heated in syrup at a temperature ranging from 50 to 100° C. for 5 to 30 minutes. This treatment is effected to deactivate unnecessary enzyme present therein as well as to permeate a proper amount of sugar into the peaches or the like. The permeation of sugar contributes to making the chips finally obtained crisp. It is, therefore, possible to freely control the texture of these chips from crisp and hardness to crisp and tender by adjusting the amount of sugar permeated into the starting fruit. Sugar content in the syrup expressed as the degree of Brix is in the range of from 12 to 30 and preferably from 15 to 25. If a syrup having a Brix degree of less than 12 is used, a sufficient amount of sugar cannot be permeated into the fruit within a short period and as a result, it is difficult to obtain chips which are crisp. On the contrary, if a syrup having a Brix degree of more than 30 is used, sugar permeates into the fruit to a great extent, which results in the production of chips which are very hard. In addition, the amount of sugar permeated into the fruits can be controlled only with a great difficulty, which makes it difficult to produce products exhibiting uniform taste.

Moreover, the crispness of the final products can be enhanced by adding cyclodextrin to the syrup defined above. In such a case, cyclodextrin is preferably used in an amount of 5 to 15% by weight.

The peaches or the like thus treated are cut into pieces of a proper size. The size of these pieces is not critical in the invention, however, these are preferably cut into pieces of sliced form having a thickness ranging from 3 to 5 mm.

Thereafter, the sliced fruit is subjected to a temperature conditioning treatment. This treatment is carried out to make the temperature of the fruits uniform and specifically the temperature thereof is controlled to about 10° to 35° C., preferably from about 15 to 25° C. The temperature conditioning treatment is carried out by, for instance, packing the sliced fruit in a bag and immersing the bag in running water of a desired temperature, packing the sliced fruit in a container and immersing the container in a constant temperature bath, or permitting the sliced fruit to stand at normal temperature. The treatment time will vary depending on the treating method but is preferably in the range of about 5 to 30 minutes. Preferred among these methods are that of packing the sliced fruit in an appropriate bag and immersing the bag in running water since the treatment time by this method is short (about 3 to 10 minutes).

After the temperature conditioning treatment, the pieces of fruits are expanded under a reduced pressure. If foods are maintained at a reduced pressure, the boiling point of the water therein is lowered and for this reason, the moisture in the foods, in particular, free water therein is evaporated off. The foods can be expanded by quickly evaporating such moisture in the foods within a very short period. For this reason, the expansion treatment according to the method of this invention is carried out by reducing the pressure applied to these foods at a rate sufficient to quickly evaporate the moisture in the foods within a short period of time. The expansion due to the evaporation of moisture is greatly affected by the kinds of foods and, therefore, the rate of the pressure reduction sufficient to cause expansion also varies depending thereon. In the present invention, the expansion treatment is preferably carried out by reducing the pressure, within about 1 minute, from normal pressure to a prescribed reduced pressure. The reduced pressure is preferably in the range of 150 to 500 Pa. This is because if the reduced pressure is less than 150 Pa, the resultant chips are soft in taste and are less crisp. While if the reduced pressure is more than 500 Pa, the resultant chips become very hard in taste and are poor or thin due to drying.

A fruit such as peach is preferably maintained at the reduced pressure for a desired period of time after quickly reducing the pressure to such a reduced pressure. The time for maintaining the fruits at such a pressure is preferably 5 to 15 minutes whereby these fruit can be properly frozen while maintaining the shape thereof.

The expanded fruit is then heated at a pressure lower than that in the expansion step to dry the same. The use of such a low pressure in this heat-drying step is to dry the fruit without impairing the quality of the fruit poor due to drying while maintaining the internal portion thereof in the proper frozen state. The pressure during the heat-drying step preferably ranges from about 20 to 50 Pa. The heating temperature is suitably in the range of about 60° to 90° C. The drying is in general continued for 2 to 4 hours until the moisture content of the fruit is not more than about 6% by weight. This is because if the drying temperature is less than 60° C., the drying time becomes long and soft, soggy chips are obtained, while if the drying temperature is more than 90° C., the taste fruit is impaired and the chips that are very hard and of poor quality due to drying are obtained. The means used for heating is not critical in the present invention. However, preferred means for heating are radiation heating ones such as those utilizing infrared rays. After the completion of the heat-drying step, the pressure is returned to normal and the fruit is transferred to the subsequent process such as the packaging process.

Referring now to the attached FIG. 1, a specific device which may be used to carry out the method of this invention will be explained.

In FIG. 1, the reference numeral 1 denotes a drying chamber which is equipped with a shelf 2 for receiving material A to be treated. Heaters 3 and 4 are disposed above and below the shelf 2. A cold trap 6 is connected to the drying chamber 1 at the side wall thereof through a pipe 5 and to a vacuum pump 8 through a pipe 7. The pipes 5 and 7 are provided with valves 9 and 10 respectively and a reservoir tank 13 is connected to the pipe 5 through pipes 11 and 12 disposed before and behind the pipe 5 respectively. In addition, the pipes 11 and 12 each is provided with a valve 14 or 15. An air supply pipe 16, which serves to return the pressure in the drying chamber 1 to normal pressure after the drying treatment, is disposed on the upper side of the drying chamber 1 and is provided with a needle valve 17.

The expansion treatment using such an apparatus is carried out as follows. Fruit, e.g. peach is placed on the shelf 2 in the drying chamber 1 and then the lid of the chamber is closed. Then, the cold trap 6 is operated, the valves 9 and 14 are closed and the pressure in the reservoir tank 13 is set at 5 to 40 Pa by opening the valves 10 and 15 and actuating the vacuum pump 8. At this stage, the valve 15 is closed while the valve 14 is opened to reduce the pressure in the drying chamber 1 to 150 to 500 Pa within a short time (within one minute). Moreover, the heat drying treatment is effected as follows. The valve 14 is closed, while the valve 9 is opened to reduce the pressure in the drying chamber 1 to 20 to 50 Pa. Thereafter, the infrared lamps 3 and 4 are switched on to dry the materials at a desired temperature for a desired period of time. Then, the valve 9 is closed, the vacuum pump 8 is stopped and the valve 16 is slowly opened to return the pressure in the drying chamber 1 to normal. Then, the lid of the chamber is opened to remove dried chips.

The method of the present invention makes it possible to provide chips of peach or melon which retain their inherent fresh taste and have excellent appearance without quality impairment due to drying. Moreover, the chips are properly expanded and are crisp. Therefore, they are very excellent as a snack food.

EXAMPLE

Example 1

Peeled peaches from which the stones had been removed 10 were subjected to heat treatment in syrup having a Brix degree of 18.4 (sucrose : 12% by weight; cyclodextrin : 8% by weight) at 100° C. for 15 minutes. The treated peaches were cut in round slices of 3 to 5 mm thick. The round slices of peach were allowed to stand at room temperature for 30 minutes to adjust the temperature thereof to about 21° C. Then, the resultant peach slices were expanded by placing them in a vacuum dryer, reducing the pressure therein to 225 Pa within a short period (within 1 minute) and then permitting them to stand for 5 minutes at a pressure of 225 Pa. Thereafter, the expanded peach slices were heat-dried at 80° C. and 23 Pa for 2.5 hours to obtain chips of peach.

The moisture content of the chips of peach was 4.9% by weight. Appearance and taste of the peach chips thus prepared are listed in Table I given below.

Example 2

Peeled peaches from which the stones had been removed were subjected to heat treatment in syrup having a Brix degree of 12(sucrose: 7.8% by weight; cyclodextrin: 4.8% by weight) at 100° C. for 15 minutes. The treated peaches were cut in round slices having a thickness of 3 to 5 mm. The round slices of peach were allowed to stand at room temperature for 30 minutes to adjust the temperatuere thereof to about 23° C. Then, the resultant peach slices were expanded by placing them in a vacuum dryer, reducing the pressure therein to 250 Pa within a short period (within 1 minute) and then permitting them to stand for 5 minutes at a pressure of 250 Pa. Thereafter, the expanded peach slices were heat-dried at 80° C. and 20 Pa for 2.5 hours to obtain chips of peach.

The moisture content of the peach chips were 5.1% by weight. The peach chips thus obtained were slightly inferior in crispness to those obtained in Example 1. However, they exhibited fresh taste and excellent appearance without quality impairment due to drying.

Example 3

Peeled peaches from which the stones had been removed

Peeled peaches from which the stones had were subjected to heat treatment in syrup having a Brix degree of 30 (sucrose : 20% by weight; cyclodextri 13% by weight) at 100° C. for 15 minutes. The treated peaches were cut in round slices having a thickness of 3 to 5 mm. The round slices of peach were allowed to stand at room temperature for 30 minutes to adjust the temperatuere thereof to about 22° C. Then, the resultant peach slices were expanded by placing them in a vacuum dryer, reducing the pressure therein to 230 Pa within a short period of time (within 1 minute) and then permitting them to stand for 5 minutes at a pressure of 230 Pa. Thereafter, the expanded peach slices were heat-dried at 80° C. and 20 Pa for 2.5 hours to obtain chips of peach.

The moisture content of the peach chips were 4.8% by weight. The peach chips thus obtained were slightly more crunchy than those obtained in Example 1. However, they exhibited fresh taste and excellent appearance without quality impairment due to drying.

Example 4

Peeled melons were subjected to heat treatment in syrup having a Brix degree of 18 (sucrose : 12% by weight; cyclodextrin : 8% by weight) at 80° C. for 10 minutes. The treated melons were cut in slices 3 to 5 mm thick. The melon slices were allowed to stand at room temperature for 30 minutes to adjust the temperatuere thereof to about 23° C. Then, the resultant melon slices were expanded by placing them in a vacuum dryer, reducing the pressure therein to 150 Pa within a short period of time (within 1 minute) and then permitting them to stand for 5 minutes at a pressure of 150 Pa. Thereafter, the expanded melon slices were heat-dried at 80° C. and 20 Pa for 2.5 hours to obtain chips of melon.

The moisture content of the melon chips were 4.1% by weight. Appearance and taste of the melon chips thus prepared are listed in Table I.

Comparative Example 1 and 2

Peach chips were obtained in the same manner as in Example 1 except that syrup having a Brix degree of 10 (sucrose : 6.7% by weight; cyclodextrin : 4.4% by weight) and syrup having a Brix degree of 40 (sucrose : 26.7% by weight; cyclodextrin : 17.6% by weight) were used in Comparative Examples 1 and 2, respectively. The results observed are summarized in Table I.

Comparative Example 3

Peach chips were produced in the same manner as in Example 1 except that the expansion treatment was carried out by placing the round slices of peach in a vacuum dryer, reducing the pressure therein to 50 Pa within a short period of time (within 1 minute) and then drying them at the same pressure. The results obtained are summarized in Table I.

TABLE I

| Example 1 | |
|---|---|
| Appearance: | The chips were not impaired in quality due to drying and were properly expanded. In addition, they had a beautiful surface. |
| Taste: | The chips were crisp, easily melted in the mouth and sufficiently retained the taste of fresh peach. |
| Example 4 | |
| Appearance: | The chips were not impaired in quality due to drying and were properly expanded. In addition, they had a beautiful surface. |
| Taste: | The chips were crisp and crunchy and sufficiently retained the taste of fresh melon. |
| Comparative Example 1 | |
| Appearance: | The product seemed to be excessively expanded and the surface was slightly coarse. |
| Taste: | The product was less crisp. However, it easily melted in the mouth. It exhibited slightly low sweetness. |
| Comparative Example 2 | |
| Appearance: | The product was poor due to drying, had low degree of expansion and a rather hard surface. |
| Taste: | The product was hard and brittle rather than crisp and was tough. It did not easily melt in the mouth. It exhibited the taste of peach but was too sweet. |
| Comparative Example 3 | |
| Appearance: | The product seemed to be excessively expanded and was porous in texture. Further, there was observed a slight roughness on the surface. |
| Taste: | The product was crisp but while it was inferior in texture. The taste of peach thereof was almost the same as that observed in Example 1. |

What is claimed is:

1. A method for producing fruit chips comprising the steps of:
   (a) heating peaches or melons in syrup having a Brix degree ranging from 12 to 30 at a temperature ranging from 50 to 100° C. for 5 to 30 minutes;
   (b) cutting the heated peaches or melons into small pieces;
   (c) controlling the temperature of the pieces of peaches or melons to 10° to 35° C.;
   (d) rapidly reducing the pressure surrounding the pieces of peaches or melon from atmospheric pressure to 150 to 500 Pa within one minute to expand the pieces; and
   (e) heating the expanded pieces under a reduced pressure lower than that in the step (d).

2. A method according to claim (1) wherein, in the step (a), the syrup contains 5 to 15% by weight of cyclodextrin.

3. A method according to claim (1) wherein, in the step (b), the heated peach or melon is cut into small pieces of 3 to 5 mm thick.

4. A method according to claim 1, wherein the expansion treatment is carried out by rapidly reducing the pressure to the prescribed reduced pressure and then maintaining this reduced pressure for 5 to 15 minutes.

5. A method according to claim 1 wherein the pressure in the step (e) is in the range of from 30 to 50 Pa.

* * * * *